United States Patent
Seo et al.

(10) Patent No.: US 9,852,070 B2
(45) Date of Patent: Dec. 26, 2017

(54) CACHE MEMORY SYSTEM USING A TAG COMPARATOR TO DETERMINE UPDATE CANDIDATES AND OPERATING METHOD THEREOF

(71) Applicant: Samsung Electronics Co., Ltd., Suwon-si (KR)

(72) Inventors: Woong Seo, Hwaseong-si (KR); Sangheon Lee, Hwaseong-si (KR); Soojung Ryu, Hwaseong-si (KR); Yeongon Cho, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 93 days.

(21) Appl. No.: 14/692,828

(22) Filed: Apr. 22, 2015

(65) Prior Publication Data
US 2016/0077969 A1  Mar. 17, 2016

(30) Foreign Application Priority Data
Sep. 17, 2014  (KR) .................. 10-2014-0123704

(51) Int. Cl.
*G06F 12/0802*  (2016.01)
*G06F 12/0864*  (2016.01)
*G06F 12/121*  (2016.01)

(52) U.S. Cl.
CPC ...... *G06F 12/0802* (2013.01); *G06F 12/0864* (2013.01); *G06F 12/121* (2013.01); *G06F 2212/1044* (2013.01); *G06F 2212/604* (2013.01)

(58) Field of Classification Search
CPC ............ G06F 12/0802; G06F 12/0864; G06F 12/121; G06F 2212/1044; G06F 2212/604;
(Continued)

(56) References Cited

U.S. PATENT DOCUMENTS 6,122,709 A * 9/2000 Wicki ................. G06F 12/0895
711/118
6,131,143 A  10/2000 Sakai
(Continued)

FOREIGN PATENT DOCUMENTS

JP        4008947 B2    11/2007
KR   10-0851298 B1     8/2008
(Continued)

OTHER PUBLICATIONS

H. Park, S. Yoo and S. Lee, "A Novel Tag Access Scheme for Low Power L2 Cache", 2011 Design, Automation & Test in Europe, Grenoble, 2011, pp. 1-6.*
(Continued)

*Primary Examiner* — Reginald Bragdon
*Assistant Examiner* — Aaron D Ho
(74) *Attorney, Agent, or Firm* — F. Chau & Associates, LLC

(57) ABSTRACT

A cache memory apparatus includes a tag comparator configured to compare upper bits of each of pieces of tag data included in a set indicated by a set address that is received with upper bits of a tag address that is received, compare other bits of each of the pieces of the tag data with other bits of the tag address, and determine whether there is a cache hit or a cache miss based on results of the comparisons, and an update controller configured to, in response to the cache miss, determine, as an update candidate, a piece of cache data included in the set and corresponding to the pieces of the tag data, based on the result of the comparison of the upper bits of each of the pieces of the tag data and the upper bits of the tag address, and update the update candidate with new data.

25 Claims, 13 Drawing Sheets

(58) Field of Classification Search
CPC ......... G06F 2212/6082; G06F 12/0853; G06F 12/0844; G06F 12/0846; G06F 12/125–12/128
USPC ........................................................ 711/133
See application file for complete search history.

(56) References Cited

U.S. PATENT DOCUMENTS

| | | | |
|---|---|---|---|
| 6,138,211 A | 10/2000 | Ahn et al. | |
| 6,449,694 B1* | 9/2002 | Burgess, Jr. | G06F 12/0864 711/118 |
| 6,493,797 B1* | 12/2002 | Lee | G06F 9/3802 711/118 |
| 6,581,140 B1* | 6/2003 | Sullivan | G06F 12/0864 711/128 |
| 6,687,789 B1* | 2/2004 | Keller | G06F 12/0864 711/125 |
| 6,950,904 B2 | 9/2005 | Erdner et al. | |
| 7,020,748 B2 | 3/2006 | Caprioli | |
| 7,069,390 B2* | 6/2006 | Chen | G06F 12/0802 707/999.104 |
| 7,512,739 B2 | 3/2009 | Sawdey et al. | |
| 7,546,417 B1* | 6/2009 | Rajamony | G06F 12/0864 711/118 |
| 8,364,900 B2 | 1/2013 | Caprioli et al. | |
| 2008/0022064 A1 | 1/2008 | Kenkare et al. | |
| 2009/0182951 A1* | 7/2009 | Matick | G06F 12/122 711/134 |
| 2011/0022773 A1 | 1/2011 | Rajamony et al. | |
| 2013/0132675 A1 | 5/2013 | Sleiman et al. | |
| 2013/0339621 A1 | 12/2013 | Steely, Jr. et al. | |
| 2014/0189473 A1* | 7/2014 | Szapiro | G06F 11/1064 714/807 |

FOREIGN PATENT DOCUMENTS

| | | |
|---|---|---|
| KR | 10-0962057 B1 | 6/2010 |
| WO | WO 01/50272 A1 | 7/2001 |

OTHER PUBLICATIONS

H. Park, S. Yoo and S. Lee, "A Multistep Tag Comparison Method for a Low-Power L2 Cache," in IEEE Transactions on Computer-Aided Design of Integrated Circuits and Systems, vol. 31, No. 4, pp. 559-572, Apr. 2012.*

J. Chen, R. Peng and Y. Fu, "Low power set-associative cache with single-cycle partial tag comparison," 2005 6th International Conference on ASIC, Shanghai, 2005, pp. 73-77.*

Extended European Search Report issued in counterpart European Application No. 15176630.0 dated Feb. 18, 2016 (8 pages).

* cited by examiner

FIG. 6 hit_results_h[M-1:0] | 1 | 0 | 0 | 0 |

FIG. 9

| | | | | |
|---|---|---|---|---|
| hit_results_h[0][M−1:0] | 1 | 0 | 0 | 0 |
| hit_results_h[1][M−1:0] | 0 | 0 | 0 | 0 |
| hit_results_h[2][M−1:0] | 0 | 1 | 1 | 0 |
| hit_results_h[3][M−1:0] | 0 | 0 | 0 | 0 |

FIG. 13

| | | | | |
|---|---|---|---|---|
| hit_results_d[0][M-1:0] | 0 | 0 | 0 | 1 |
| hit_results_d[1][M-1:0] | 0 | 0 | 0 | 0 |
| hit_results_d[2][M-1:0] | 1 | 1 | 0 | 0 |
| hit_results_d[3][M-1:0] | 0 | 0 | 0 | 0 |

# CACHE MEMORY SYSTEM USING A TAG COMPARATOR TO DETERMINE UPDATE CANDIDATES AND OPERATING METHOD THEREOF

CROSS-REFERENCE TO RELATED APPLICATION

This application claims the benefit under 35 USC 119(a) of Korean Patent Application No. 10-2014-0123704, filed on Sep. 17, 2014, in the Korean Intellectual Property Office, the entire disclosure of which is incorporated herein by reference for all purposes.

BACKGROUND

1. Field

The following description relates to a cache memory system and an operating method thereof.

2. Description of Related Art

In general, processing units such as a central processing unit (CPU) and a graphics processing unit (GPU) access and process commands and data stored in a large capacity external memory. Since processing speeds of most large capacity external memories are much slower than those of the processing units, a cache memory system is employed to improve an operation speed.

The cache memory system stores data that has been recently accessed by the processing unit. When the processing unit requests the same data again, the cache memory system accesses a high speed cache memory, instead of accessing an external memory, thereby improving a data transfer rate.

If the data requested by the processing unit is loaded on a data memory of the cache memory system (cache hit), the data is transferred to the processing unit. If the data requested by the processing unit does not exist (cache miss), the data is read out from the external memory. Also, the cache memory system erases any piece of cache data stored in the data memory, updates the erased cache data with the read data, and transfers the read data to the processing unit.

The cache memory system may be embodied in a set-associative cache memory using a set-associative mapping method and in a direct mapped cache memory using a direct mapping method, according to a mapping method. The set-associative cache memory has a plurality of ways. For the cache miss, the cache data corresponding to any one way is updated with new data read from the external memory according to a replacement status.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a cache memory apparatus including a data memory configured to store pieces of cache data corresponding to pieces of data stored in a main memory, and a tag memory including a set, and configured to store pieces of tag data respectively corresponding to the pieces of the cache data as the set, each of the pieces of the tag data including N bits. The apparatus further includes a tag comparator configured to compare upper K bits, wherein 1≤K<N, of each of the pieces of the tag data included in the set indicated by a set address that is received with upper K bits of a tag address that is received, the tag address including N bits, compare other (N−K) bits of each of the pieces of the tag data with other (N−K) bits of the tag address, and determine whether there is a cache hit or a cache miss based on results of the comparisons. The apparatus further includes an update controller configured to, in response to the cache miss being determined, determine a piece among the pieces of the cache data as an update candidate based on the result of the comparison of the upper K bits of each of the pieces of the tag data and the upper K bits of the tag address, and update the update candidate with new data.

The update controller may be configured to determine the piece of the cache data as the update candidate in response to upper K bits of a piece of the tag data that corresponds to the piece of the cache data not matching with the upper K bits of the tag address.

The tag comparator may be configured to determine there is a cache miss, and output, to the update controller, the result of the comparison of the upper K bits of each piece of the tag data and the upper K bits of the tag address, in response to any of the pieces of the tag data not matching the tag address.

The tag comparator may be configured to determine there is a cache hit in response to any of the pieces of the tag data matching the tag address.

The cache memory apparatus may further include a data output portion configured to read a piece among the pieces of the cache data that corresponds to a piece among the pieces of the tag data that matches the tag address, and output the read piece, in response to the cache hit being determined.

The update controller may be configured to, in response to the cache memory apparatus receiving data requests, each having a same set address, determine the piece of the cache data as the update candidate for each of pieces of data of the data requests based on the result of the comparison of the upper K bits of the tag address that is received for each of the pieces of the data and the upper K bits of each of the pieces of the tag data, and update, with new data, the piece among the pieces of the cache data that is most frequently determined as the update candidate.

The tag comparator may be further configured to output comparison vectors respectively corresponding to the pieces of the data, each of the comparison vectors including a same number of components as a number of ways of the set, the components indicating a first value in response to the upper K bits of the tag address of each of the pieces of the data and the upper K bits of each of the pieces of the tag data match each other, and the components indicating a second value in response to the upper K bits of the tag address of each of the pieces of the data and the upper K bits of each of the pieces of the tag data do not match each other, and the update controller may be configured to sum the components of the comparison vectors for each of the ways, and update, with new data, cache data corresponding to any one of the ways, based on the summed components.

The first value may be 1, the second value may be 0, and the update controller may be configured to update, with new data, cache data corresponding to a way having a smallest component among the summed components.

In another general aspect, there is provided a cache memory apparatus including a data memory configured to store pieces of cache data corresponding to pieces of data stored in a main memory, and a tag memory including a set, and configured to store pieces of tag data respectively corresponding to the pieces of the cache data as the set, each of the pieces of the tag data including N bits. The apparatus may further include a tag comparator configured to calculate a difference between upper K bits, wherein 1≤K<N, of each of the pieces of the tag data included in a set indicated by a set address that is received and upper K bits of a tag address that is received, the tag address including N bits, compare the tag address and each of the pieces of the tag data, and determine whether there is a cache hit or a cache miss based on a result of the comparison. The apparatus may further include an update controller configured to, in response to the cache miss being determined, determine a piece among the pieces of the cache data as an update candidate based on the difference, and update the update candidate with new data.

The update controller may be configured to determine the piece of the cache data as the update candidate in response to the difference being greater than or equal to a predetermined value.

The tag comparator may be configured to determine there is a cache miss, and output, to the update controller, the difference, in response to any of the pieces of the tag data not matching the tag address.

The update controller may be configured to, in response to the cache memory apparatus receiving data requests, each having a same set address, determine the piece of the cache data as the update candidate for each of pieces of data of the data requests based on the difference, and update, with new data, the piece among the pieces of the cache data that is most frequently determined as the update candidate.

In still another general aspect, there is provided a method of operating a cache memory apparatus, the method including comparing upper K bits, wherein 1≤K<N, of each of pieces of tag data included in a set indicated by a set address that is received with upper K bits of a tag address that is received, the pieces of the tag data respectively corresponding to pieces of cache data as the set, each of the pieces of the tag data including N bits, the tag address including N bits, and the pieces of the cache data corresponding to pieces of data. The method further includes comparing other (N−K) bits of each of the pieces of the tag data with other (N−K) bits of the tag address, and determining whether there is a cache hit or a cache miss based on results of the comparisons. The method further includes in response to the cache miss being determined, determining a piece among the pieces of the cache data as an update candidate based on the result of the comparison of the upper K bits of each of the pieces of the tag data and the upper K bits of the tag address, and updating the update candidate with new data.

The determining of the piece of the cache data as the update candidate may include determining the piece of the cache data as the update candidate in response to upper K bits of a piece of the tag data that corresponds to the piece of the cache data not matching with the upper K bits of the tag address.

The determining of whether there is a cache hit or a cache miss may include determining there is a cache miss, and outputting the result of the comparison of the upper K bits of each piece of the tag data and the upper K bits of the tag address, in response to any of the pieces of the tag data not matching the tag address.

The determining of whether there is a cache hit or a cache miss may include determining there is a cache hit in response to any of the pieces of the tag data matching the tag address.

The method may further include reading a piece among the pieces of the cache data that corresponds to a piece among the pieces of the tag data that matches the tag address, and outputting the read piece, in response to the cache hit being determined.

In response to receiving data requests, each having a same set address, the determining of the piece of the cache data as the update candidate may include determining the piece of the cache data as the update candidate for each of pieces of data of the data requests based on the result of the comparison of the upper K bits of the tag address that is received for each of the pieces of the data and the upper K bits of each of the pieces of the tag data, and the updating of the update candidate includes updating, with new data, the piece among the pieces of the cache data that is most frequently determined as the update candidate.

The method may further include outputting comparison vectors respectively corresponding to the pieces of the data, each of the comparison vectors including a same number of components as a number of ways of the set, the components indicating a first value in response to the upper K bits of the tag address of each of the pieces of the data and the upper K bits of each of the pieces of the tag data match each other, and the components indicating a second value in response to the upper K bits of the tag address of each of the pieces of the data and the upper K bits of each of the pieces of the tag data do not match each other. The updating of the update candidate may include summing the components of the comparison vectors for each of the ways, and updating, with new data, cache data corresponding to any one of the ways, based on the summed components.

The first value may be 1, the second value may be 0, and the updating of the updating candidate may include updating, with new data, cache data corresponding to a way having a smallest component among the summed components.

In yet another general aspect, there is provided a method of operating a cache memory apparatus, the method including calculating a difference between upper K bits, wherein 1≤K<N, of each of pieces of tag data included in a set indicated by a set address that is received and upper K bits of a tag address that is received, the pieces of the tag data respectively corresponding to pieces of cache data as the set, each of the pieces of the tag data including N bits, the tag address including N bits, and the pieces of the cache data corresponding to pieces of data. The method further includes comparing the tag address and each of the pieces of the tag data, and determining whether there is a cache hit or a cache miss based on results of the calculation and comparison. The method further includes in response to the cache miss being determined, determining a piece among the pieces of the cache data as an update candidate based on the difference, and updating the update candidate with new data.

The determining of the piece of the cache data as the update candidate may include determining the piece of the cache data as the update candidate in response to the difference being greater than or equal to a predetermined value.

The determining of whether there is a cache hit or a cache miss may include determining there is a cache miss, and outputting the difference, in response to any of the pieces of the tag data not matching the tag address.

In response to receiving data requests, each having a same set address, the determining of the piece of the cache data as the update candidate may include determining the piece of the cache data as the update candidate for each of pieces of data of the data requests based on the difference, and the updating of the update candidate may include updating, with new data, the piece among the pieces of the cache data that is most frequently determined as the update candidate.

In still another general aspect, there is provided a cache memory apparatus including a tag comparator configured to compare upper bits of each of pieces of tag data included in a set indicated by a set address that is received with upper bits of a tag address that is received, compare other bits of each of the pieces of the tag data with other bits of the tag address, and determine whether there is a cache hit or a cache miss based on results of the comparisons. The apparatus further includes an update controller configured to, in response to the cache miss being determined, determine, as an update candidate, a piece among pieces of cache data included in the set and corresponding to the pieces of the tag data, based on the result of the comparison of the upper bits of each of the pieces of the tag data and the upper bits of the tag address, and update the update candidate with new data.

The tag comparator may be configured to determine there is a cache miss in response to any of the pieces of the tag data not matching the tag address, and determine there is a cache hit in response to any of the pieces of the tag data matching the tag address.

The update controller may be configured to determine, as the update candidate, the piece of the cache data in response to the upper bits of a piece of the tag data that corresponds to the piece of the cache data not matching with the upper bits of the tag address.

Other features and aspects will be apparent from the following detailed description, the drawings, and the claims.

BRIEF DESCRIPTION OF THE DRAWINGS

FIG. 6 is a diagram illustrating an example of a vector "hit_results_h[M−1:0]".

FIG. 9 is a diagram illustrating an example of vectors "hit_results_h[ ][M−1:0]" with respect to a plurality of pieces of data.

FIG. 13 is a diagram illustrating another example of vectors "hit_results_d[ ][M−1:0]" with respect to a plurality of pieces of data.

DETAILED DESCRIPTION

Figure 1:
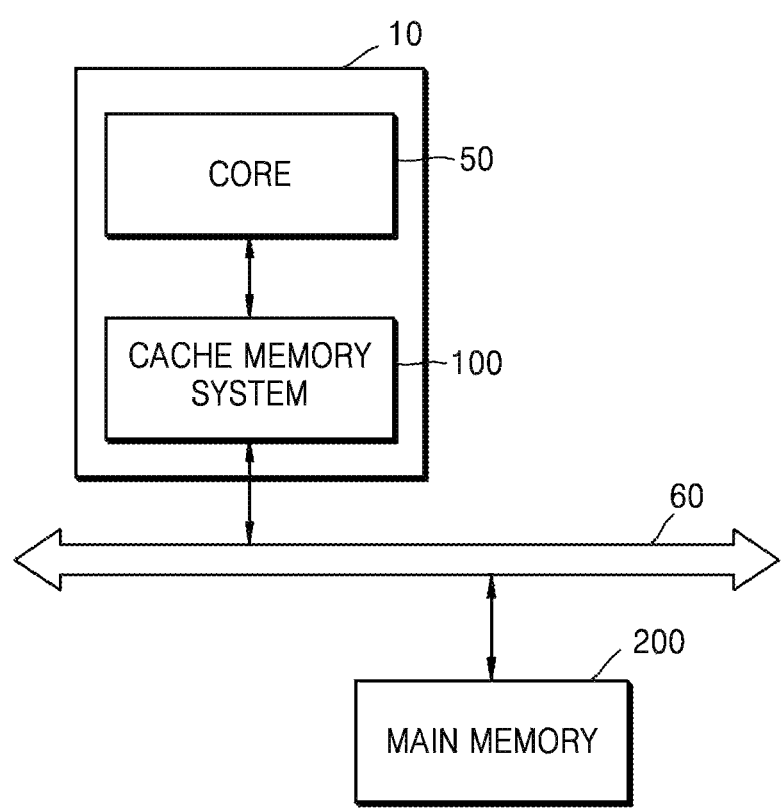
FIG. 1 is a block diagram illustrating an example of a data processing system.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a block diagram illustrating an example of a data processing system. Referring to FIG. 1, the data processing system includes a data processing unit 10 and a main memory 200. The data processing unit 10 includes a core 50 and a cache memory system 100 or cache memory apparatus. Also, a line of the cache memory system 100 and a line of the main memory 200 are connected to a system bus 60.

Although FIG. 1 illustrates the example in which the cache memory system 100 is located separately from the core 50 for convenience of explanation, the present example is not limited thereto, and the cache memory system 100 may be included in the same chip where the core 50 is included. Also, the data processing unit 10 of FIG. 1 may be a graphics processing unit (GPU), but not limited thereto.

In order to request data needed during data processing, the core 50 may access the cache memory system 100 before accessing the main memory 200. For example, when the data processing unit 10 is a GPU, the core 50 may be a pixel shader core. The pixel shader core may perform pixel shading to determine a color value of a pixel during rendering. The pixel shader core may request texture data from the cache memory system 100 to be used to determine the color value of the pixel. Also, the core 50 may include multiple cores, and the cores may simultaneously request data from the cache memory system 100.

When the data or commands (hereinafter, referred to as target data) requested by the core 50 exist in the cache memory system 100, an operation according to a cache hit is performed. During the cache hit, the cache memory system outputs cache data or the target data to the core 50.

The core 50 first accesses the cache memory system 100 prior to the main memory 200 because data of the main memory 200 that is frequently used is highly likely to be stored in the cache memory system 100. Accordingly, a data transfer rate may be improved by first accessing the cache memory system 100 prior to the main memory 200.

When no target data exists in the cache memory system 100, an operation according to a cache miss is performed. In other words, in this example, the cache memory system 100 accesses the main memory 200, and the main memory 200 outputs data to the cache memory system 100 via the system bus 60. The cache memory system 100 may erase any one piece of cache data that are previously stored, and stores the data output from the main memory 200.

Figure 2:
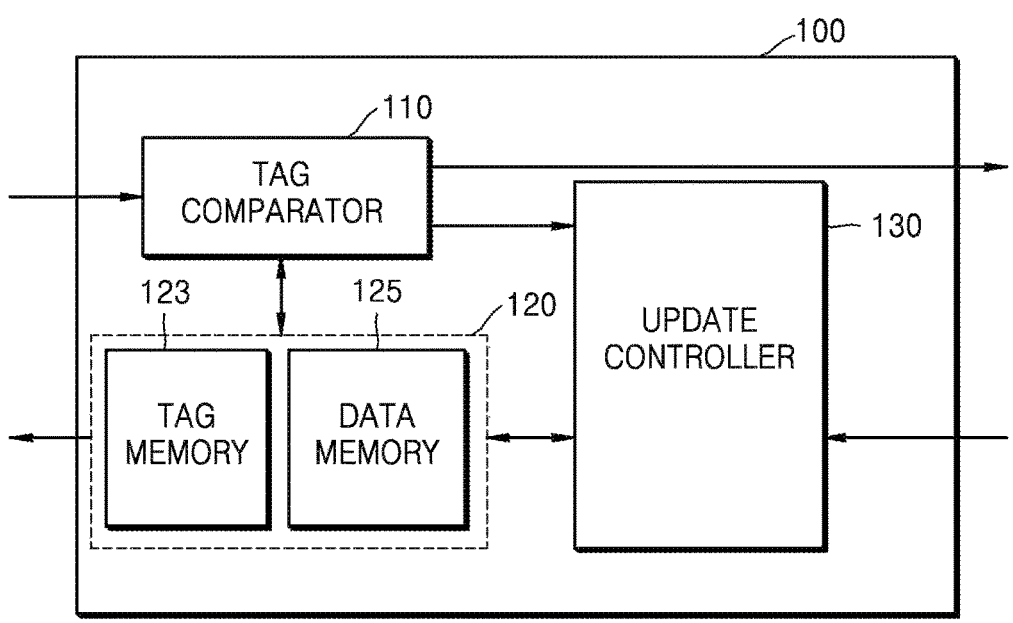
FIG. 2 is a block diagram illustrating an example of a cache memory system.

FIG. 2 is a block diagram illustrating an example of the cache memory system 100. Referring to FIG. 2, the cache memory system 100 or cache memory apparatus includes a tag comparator 110, a cache memory 120, and an update controller 130.

The cache memory 120 includes a tag memory 123 and a data memory 125. The data memory 125 stores some pieces of the data (cache data) stored in the main memory 200 of FIG. 1. In other words, the cache data is the same as any one piece of main data stored in the main memory 200. The tag memory 123 stores pieces of tag data respectively corresponding to the pieces of cache data stored in the data memory 125. The tag data may indicate an actual address of the main memory 200 where the cache data is stored. The tag memory 123 and the data memory 125 are described below in detail with reference to FIG. 3.

Figure 3:
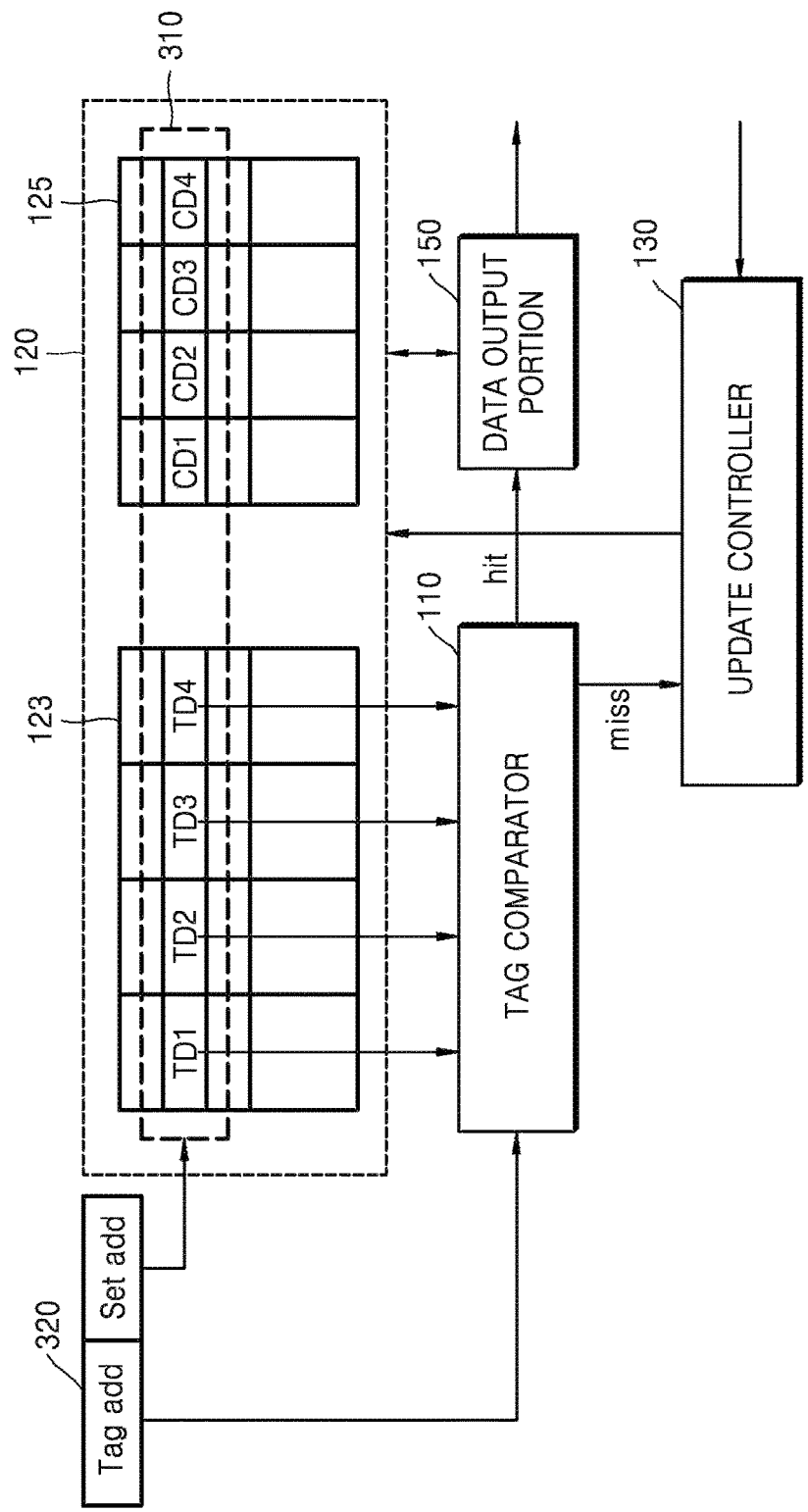
FIG. 3 is a block diagram illustrating an example of a 4-way set-associative cache memory.

FIG. 3 is a block diagram illustrating an example of a 4-way set-associative cache memory having four ways. Referring to FIG. 3, the tag memory 123 and the data memory 125 includes at least one set 310, and one set has a plurality of ways. Rows and columns of the tag memory 123 and the data memory 125 indicate sets and the ways, respectively. In other words, one set is stored at the same row of the tag memory 123 and the data memory 125. As illustrated in FIG. 3, when the cache memory 120 is a 4-way set-associative cache memory, one set includes first to fourth cache data CD1, CD2, CD3, and CD4 and first to fourth tag data TD1, TD2, TD3, and TD4 respectively indicating addresses of the first to fourth cache data CD1, CD2, CD3, and CD4.

Also, the first to fourth tag data TD1, TD2, TD3, and TD4 are stored in the same row of the tag memory 123. The first tag data TD1 corresponds to the first way. The second tag data TD2 corresponds to the second way. The third tag data TD3 corresponds to the third way. The fourth tag data TD4 corresponds to the fourth way. The first to fourth cache data CD1, CD2, CD3, and CD4 respectively corresponding to the first to fourth tag data TD1, TD2, TD3, and TD4 are stored in the data memory 125 in the same manner as the first to fourth tag data TD1, TD2, TD3, and TD4.

The cache memory system 100 externally receives an address bit 320 corresponding to the requested data. The address bit 320, as illustrated in FIG. 3, includes a tag address "Tag add" and a set address "Set add". The set address "Set add" is data indicating a row address of the cache memory 120. In other words, the set address "Set add" indicates any one set of a plurality of sets included in the cache memory 120.

When there is externally requested data, for example, by the core 50 of FIG. 1, the tag comparator 110 determines whether the requested data is stored in the cache memory 120. In other words, the tag comparator 110 determines whether there is a cache hit or a cache miss.

The tag comparator 110 determines whether each of the tag data included in the set 310 indicated by the set address "Set add" matches the tag address. If N bits of the tag address "Tag add" matches N bits of any one piece of the tag data, the tag comparator 110 determines that there is a cache hit. In other words, the cache hit means that the target data that is externally requested exists in the data memory 125.

The tag comparator 110 may compare upper K ($1 \leq K < N$) bits "Tag add[N−1:N−K]" of the N bits of the tag address "Tag add" with upper K bits "tagway[N−1:N−K]" of the N bits of the tag data. Also, the tag comparator 110 may compare other (N−K) bits "Tag add[N−K−1:0]" of the tag address "Tag add" with other (N−K) bits "tagway[N−K−1:0]" of the tag data. The tag comparator 110 may determine whether there is a cache hit or a cache miss based on results of the comparisons. The above operations of the tag comparator 110 are described below in detail with reference to FIGS. 4 and 5.

When the tag comparator 110 determines that there is a cache hit, the cache memory system 100 outputs the cache data corresponding to the tag data that matches the tag address "Tag add". That is, the tag comparator 110 outputs a cache hit signal to the data output portion 150. The data output portion 150 reads the cache data stored in the data memory 125 that correspond to the tag data that matches the tag address "Tag add", and outputs the read cache data. In contrast, when the tag comparator 110 determines that there is a cache miss, the tag comparator 110 outputs a cache miss signal to the main memory 200 of FIG. 1, and may request the target data. Also, the tag comparator 110 may output, to the update controller 130, the results of the comparisons of the other (N−K) bits of the tag address "Tag add" and the other (N−K) bits of the tag data.

The update controller 130 may determine an update candidate based on the result of the comparisons of the other (N−K) bits of the tag address "Tag add" and the other (N−K) bits of the tag data. The update controller 130 may erase any one piece of the cache data that is determined to be the update candidate, and may update the erased cache data with new data received from the main memory 200.

Figure 4:
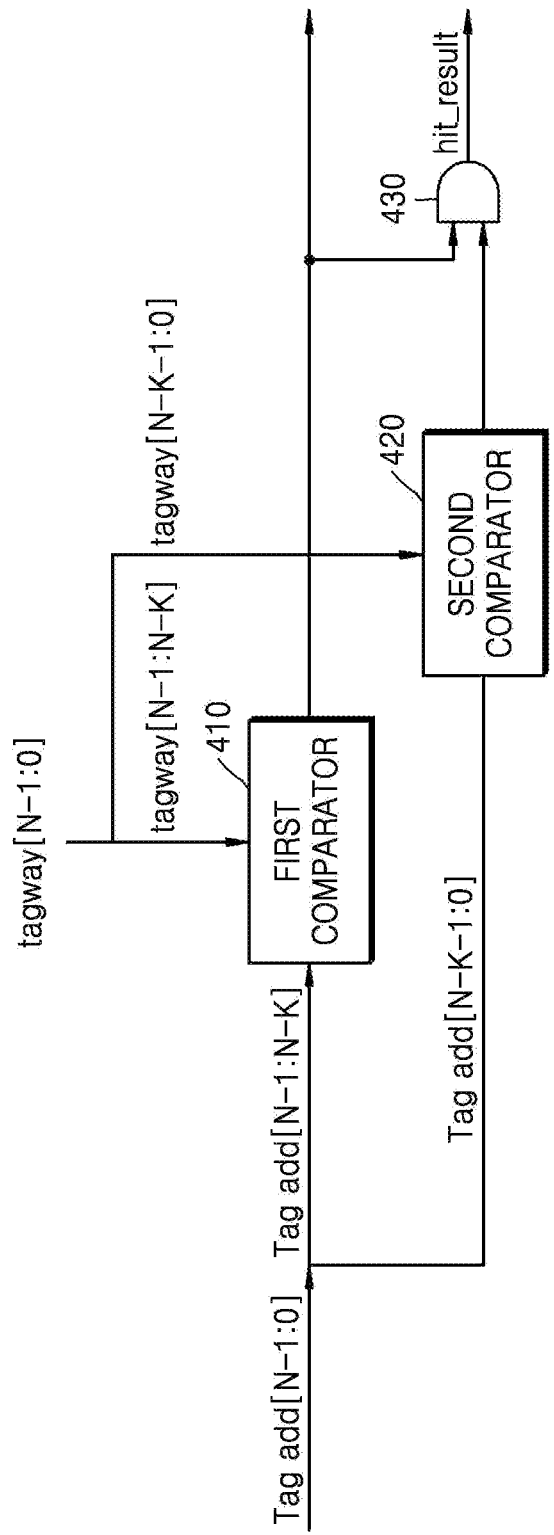
FIG. 4 is a circuit diagram illustrating an example of a method of comparing tag data corresponding to one of a plurality of ways included in one set, with a tag address.

FIG. 4 is a circuit diagram illustrating an example of a method of comparing tag data corresponding to one of a plurality of ways included in one set, with a tag address. Referring to FIG. 4, the tag data stored in the tag memory 123 of FIGS. 2-3 and the tag address are indicated by N bits. Also, the tag comparator 110 includes a first comparator 410, a second comparator 420, and an AND operator 430. The first comparator 410 is a K-bit comparator, and the second comparator 420 is a (N−K) bit comparator.

The first comparator 410 compares the upper K ($1 \leq K < N$) bits "Tag add[N−1:N−K]" of the tag address "Tag add" and the upper K bits "tagway[N−1:N−K]" of the tag data. Also, the second comparator 420 compares the other (N−K) bits "Tag add[N−K−1:0]" of the tag address "Tag add" and the other (N−K) bits "tagway[N−K−1:0]" of the tag data.

If the upper K ($1 \leq K < N$) bits "Tag add[N−1:N−K]" of the tag address "Tag add" and the upper K bits "tagway[N−1:N−K]" of each piece of the tag data match each other, the first comparator 410 may output "1". Otherwise, the first comparator 410 may output "0". Alternatively, if the upper K ($1 \leq K < N$) bits "Tag add[N−1:N−K]" of the tag address "Tag add" and the upper K bits "tagway[N−1:N−K]" of the tag data match each other, the first comparator 410 may output "0". Otherwise, the first comparator 410 may output "1". However, the present example is not limited thereto.

Also, if the other (N−K) bits "Tag add[N−K−1:0]" of the tag address and the other (N−K) bits "tagway[N−K−1:0]" of the tag data match each other, the second comparator 420 may output "1". Otherwise, the second comparator 420 may output "0". Alternatively, if the other (N−K) bits "Tag add[N−K−1:0]" of the tag address and the other (N−K) bits "tagway[N−K−1:0]" of the tag data match each other, the second comparator 420 may output "0". Otherwise, the second comparator 420 may output "1". However, the present example is not limited thereto.

In the following description for convenience of explanation, the first comparator 410 and the second comparator 420 output "1" when input bit data match each other.

The AND operator 430 performs an AND operation by using output values of the first comparator 410 and the second comparator 420 as input values. For example, when the upper K (1≤K<N) bits "Tag add[N−1:N−K]" of the tag address "Tag add" and the upper K bits "tagway[N−1:N−K]" of each piece of the tag data match each other, that is, the first comparator 410 outputs "1", and the other (N−K) bits "Tag add[N−K−1:0]" of the tag address and the other (N−K) bits "tagway[N−K−1:0]" of the tag data match each other, that is, the second comparator 420 outputs "1", the AND operator 430 outputs "1" as "hit_result". In contrast, when the upper K (1≤K<N) bits "Tag add[N−1:N−K]" of the tag address "Tag add" and the upper K bits "tagway[N−1:N−K]" of each piece of the tag data do not match each other, or the other (N−K) bits "Tag add[N−K−1:0]" of the tag address and the other (N−K) bits "tagway[N−K−1:0]" of the tag data do not match each other, the AND operator 430 outputs "0" as "hit_result".

In other words, when the AND operator 430 outputs "1", it may be determined that the N bits of "Tag add[N−1:0]" of the tag address "Tag add" and the N bits of "tagway[N−1:0]" of the tag data match each other. When the AND operator 430 outputs "0", it may be determined that the N bits of "Tag add[N−1:0]" of the tag address "Tag add" and the N bits of "tagway[N−1:0]" of the tag data do not match each other.

Figure 5:
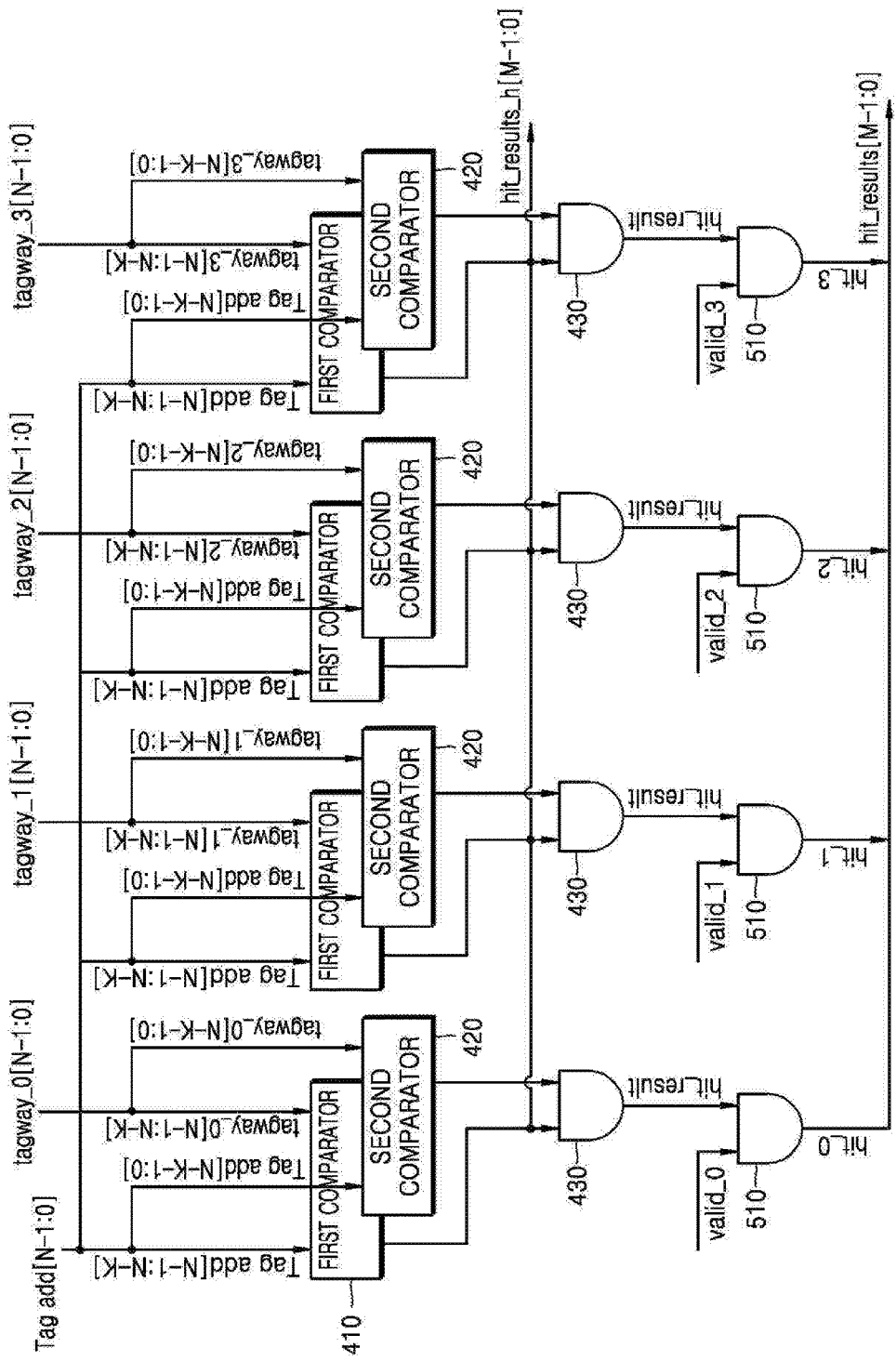
FIG. 5 is a circuit diagram illustrating an example of a method of comparing pieces of tag data corresponding to a plurality of ways included in one set, respectively with tag addresses.

FIG. 5 is a circuit diagram illustrating an example of a method of comparing pieces of tag data corresponding to a plurality of ways included in one set, respectively with tag addresses. Referring to FIG. 5, when there are an M-number of ways, the tag comparator 110 includes an M-number of first comparators, an M-number of second comparators, and a 2M-number of AND operators.

The tag comparator 110, as described with reference to FIG. 4, compares each of the tag data corresponding to a plurality of ways with the tag address "Tag add". Since the method of comparing the tag data and the tag address "Tag add" is described above in detail with reference to FIG. 4, a description thereof is omitted.

The tag comparator 110 further includes a second AND operator 510. The second AND operator 510 receives a value "valid_way" indicating whether the cache data is stored in a corresponding way of the data memory 125 of FIGS. 2-3, and a value indicating whether the tag data of the corresponding way and the tag address match each other, as an input. The value "valid_way" indicating whether the cache data is stored is "1" when the cache data is stored in the corresponding way, and is "0" when the cache data is not stored in the corresponding way.

Accordingly, when the cache data is not stored in the corresponding way, that is, the value "valid_way" is "0", and the tag data of the corresponding way and the tag address "Tag add" do not match each other, the second AND operator 510 outputs "0". Also, when the cache data is stored in the corresponding way, that is, the value "valid_way" is "1", and the tag data of the corresponding way and the tag address "Tag add" match each other, the second AND operator 510 outputs "1" as "hit_way". The tag comparator 110 outputs values from an M-number of the second AND operators corresponding to the ways as a vector "hit_results [M−1:0]". An amount of the vector is the same as the M-number of the ways.

For example, as illustrated in FIG. 5, when the cache memory 120 of FIGS. 2-3 is a 4-way cache memory, the second AND operator 510 corresponding to the first way may output "1", the second AND operator 510 corresponding to the second way may output "0", the second AND operator 510 corresponding to the third way may output "0", and the second AND operator 510 corresponding to the fourth way may output "0". Also, the output vector "hit_results[M−1:0]" may be [1, 0, 0, 0].

In this example, when any one of components of the vector indicates "1", the tag comparator 110 determines that there is a cache hit. In other words, when there is a component indicating "1", the target data of the way corresponding to the component matches the tag address, and the cache data corresponding to the tag data that matches the tag address is the target data that is externally requested, for example, by the core 50 of FIG. 1. If a cache hit is determined, the data output portion 150 of FIG. 3 reads the cache data corresponding to the tag data that matches the tag address from the data memory 125, and may output the read cache data.

In contrast, when all components of the vector indicate "0", the tag comparator 110 determines that there is a cache miss. In other words, when the target data of all ways do not match the tag address "Tag add", it is determined that the target data requested by the core 50 is not stored in the cache memory 120. When there is a cache miss, the tag comparator 110 outputs the values from the M-number of first comparators corresponding to the ways as "hit_result_h[M−1:0]".

FIG. 6 is a diagram illustrating an example of the vector "hit_results_h[M−1:0]". A size of the vector is the same as the M-number of the ways. FIG. 6 illustrates the vector "hit_results_h[M−1:0]" having four ways. Among the components of the vector "hit_results_h[M−1:0]", a component indicating "0" signifies that the upper K bits "tagway[N−1:N−K]" of the tag data corresponding to the component does not match the upper K bits "Tag add[N−1:N−K]" of the tag address. In contrast, among the components of the vector "hit_results_h[M−1:0]", a component indicating "1" signifies that the upper K bits "tagway[N−1:N−K]" of the tag data corresponding to the component matches the upper K bits "Tag add[N−1:N−K]" of the tag address.

When the upper K bits "Tag add[N−1:N−K]" of the tag address and the upper K bits "tagway[N−1:N−K]" of the tag data do not match each other, the update controller 130 may determine that no spatial locality exists between the cache data corresponding to the tag data and the externally requested data, that is, the target data. Accordingly, the cache data of the corresponding way indicating "0" of the components of the vector "hit_results_h[M−1:0]" may be determined to be an update candidate.

In the example of a cache miss, the update controller 130 of FIGS. 2-3 may receive pieces of target data from the main memory 200 of FIG. 1, may erase any one piece of the cache data that is determined to be the update candidate, and may update the erased cache data with new data received from the main memory 200. The data output portion 150 of FIG. 3 may output the new data received from the main memory 200, for example, to the core 50 of FIG. 1.

Figure 7:
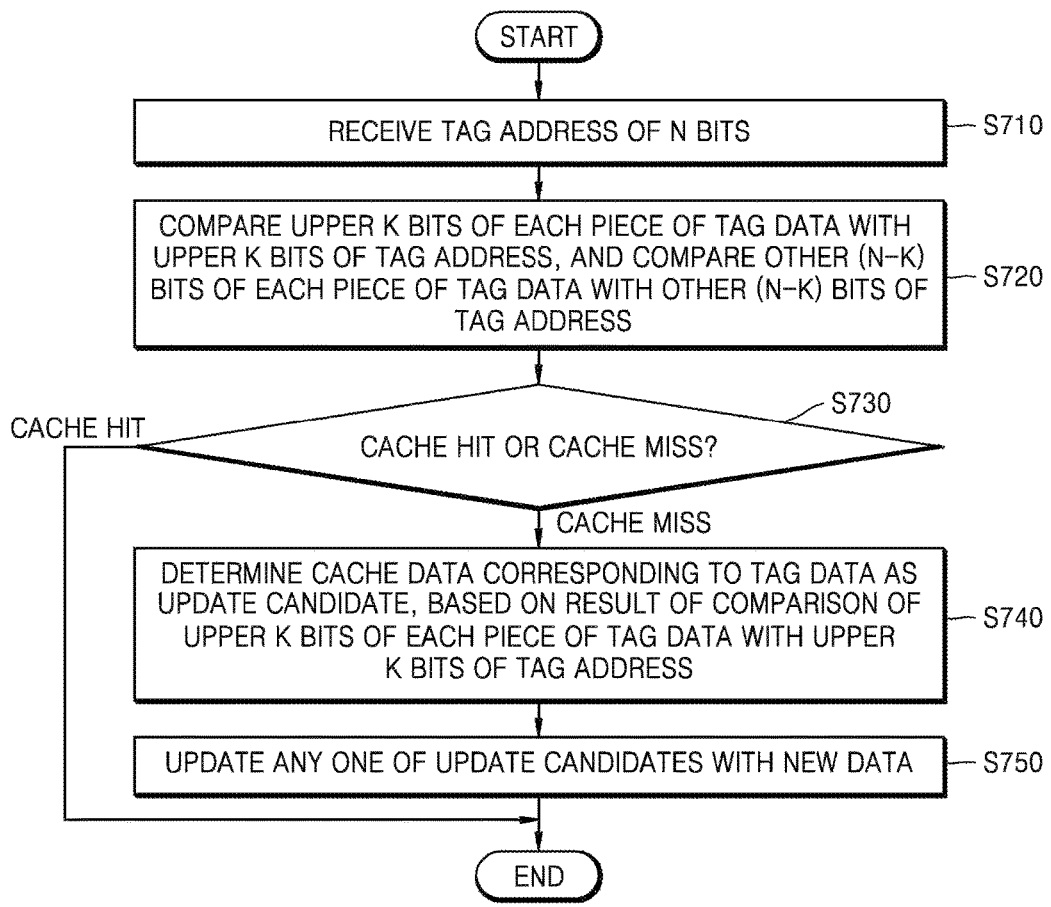
FIG. 7 is a flowchart illustrating an example of a method of updating data of a cache memory system.

FIG. 7 is a flowchart illustrating an example a method of updating data of the cache memory system 100. Referring to FIG. 7, in operation S710, the cache memory system 100 receives the tag address "Tag add[N−1:0]" of N bits.

For example, as described with reference to FIG. 3, the cache memory system 100 may externally receive a data request, and may receive the address bit including the set address "Set add" and the tag address "Tag add" corresponding to the requested data. The set address "Set add" may be data indicating a row address of the cache memory 120, and the tag address "Tag add" may be an actual address of the requested data in the main memory 200.

Also, the tag address "Tag add" includes N bits. If the address bit is received, the cache memory system 100 may output the target data included in the set indicated by the set address "Set add". The tag data may be N bits, which is the same as the tag address "Tag add".

In operation S720, the cache memory system 100 compares the upper K bits of each piece of the output tag data and the upper K bits of the tag address, and compares the other (N−K) bits of each piece of the tag data with the other (N−K) bits of the tag address. For example, the cache memory system 100 may include the first comparator 410 and the second comparator 420 of FIG. 4 or 5. The first comparator 410 may compare the upper K ($1 \leq K < N$) bits "Tag add[N−1:N−K]" of the tag address "Tag add" and the upper K bits "tagway[N−1:N−K]" of the tag data. Also, the second comparator 420 may compare the other (N−K) bits "Tag add[N−K−1:0]" of the tag address and the other (N−K) bits "tagway[N−K−1:0]" of the tag data.

In operation S730, the cache memory system 100 determines whether there is a cache hit or a cache miss based on results of the comparisons. For example, when any one piece of the output tag data matches the tag address, the cache memory system 100 determines that there is a cache hit. In contrast, when no piece of the output tag data matches the tag address, the cache memory system 100 determines that there is a cache miss, and continues in operation S740.

In this example, when an invalid data exists in the cache data of the set indicated by the set address "Set add", that is, at least one of cache lines is empty, the cache memory system 100 may store the target data received from the main memory 200 of FIG. 1 in an empty cache line. In contrast, when all pieces of the cache data of the set indicated by the set address "Set add" are valid, that is, the cache data are stored in all cache lines, the cache memory system 100 may continue in operation S740.

In operation S740, the cache memory system 100 determines the cache data corresponding to the tag data as an update candidate, based on the result of the comparison of the upper K bits of each piece of the tag data with the upper K bits of the tag address. For example, when the cache miss is determined, and the upper K bits "tagway[N−1:N−K]" of the tag data and the upper K bits "Tag add[N−1:N−K]" of the tag address match each other for each piece of the output tag data, the cache memory system 100 may determine the cache data corresponding to the tag data as an update candidate. In contrast, when the upper K bits "tagway[N−1:N−K]" of the tag data and the upper K bits "Tag add[N−1:N−K]" of the tag address do not match each other, cache memory system 100 may remove the cache data corresponding to the tag data as the update candidate.

In operation S750, the cache memory system 100 erases any one piece of cache data of determined update candidates, and updates the erased cache data with new data. When a cache miss is determined, the cache memory system 100 may output a cache miss signal, and may receive the target data from the main memory 200. The cache memory system 100 may erase any one piece of the cache data from the determined update candidate, and may update the erased cache data with the data received from the main memory 200.

Figure 8:
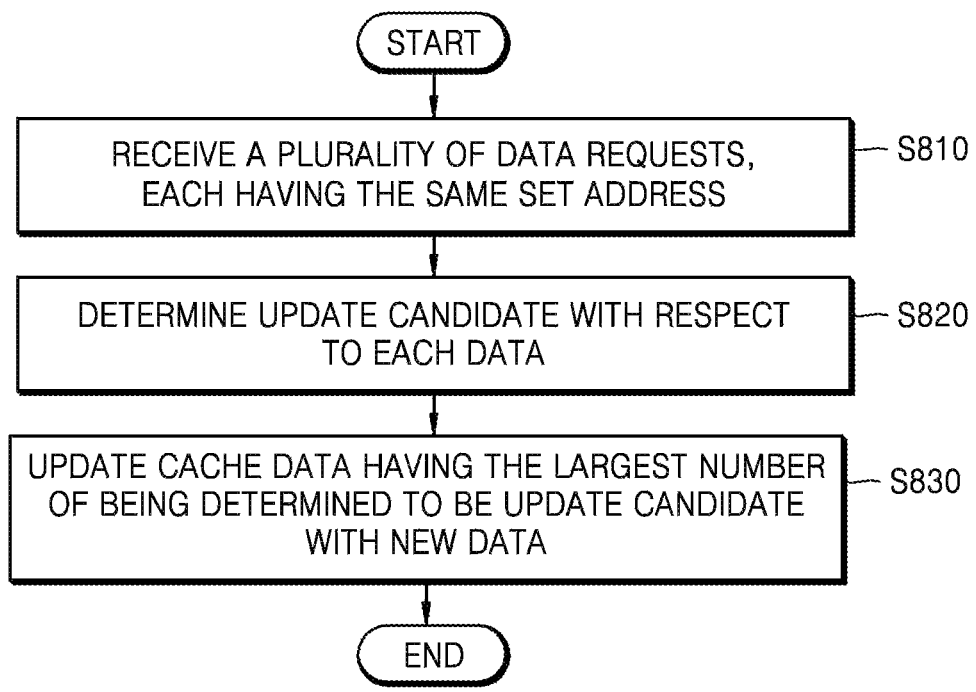
FIG. 8 is a flowchart illustrating another example of a method of updating data of a cache memory system.

FIG. 8 is a flowchart illustrating another example of a method of updating data of the cache memory system 100. Referring to FIG. 8, in operation S810, the cache memory system 100 receives a plurality of data requests, each having the same set address.

For example, when the core 50 of FIG. 1 is a multi-core, the cache memory system 100 may simultaneously receive the plurality of data requests. The cache memory system 100 may receive the tag address "Tag add" and the set address "Set add" corresponding to each of the data, and the set addresses corresponding to the data may be identical to one another.

As described with reference to FIG. 4, for each of the data, the cache memory system 100 may compare the upper K bits "Tag add[N−1:N−K]" of the tag address that is received with the upper K bits "tagway[N−1:N−K]" of each piece of the tag data included in the set indicated by the set address "Set add", and may compare the other (N−K) bits "Tag add[N−K−1:0]" of the tag address and the (N−K) bits (tagway[N−K−1:0]) of each of the tag data. The cache memory system 100 may determine whether there is a cache hit or a cache miss for each of the requested data, based on results of the comparisons. Since this process is described above in detail with reference to FIG. 5, a detailed description thereof is omitted.

When there is a cache miss, the cache memory system 100 may output the vector "hit_results_h[ ][M−1:0]" for each of the data as illustrated in FIG. 9.

FIG. 9 is a diagram illustrating an example of vectors "hit_results_h[ ][M−1:0]" with respect to a plurality of pieces of data. For example, when the cache memory system 100 simultaneously receives four data requests, a vector "hit_result_h[0][M−1:0]=[1 0 0 0]" corresponds to first data, a vector "hit_result_h[1][M−1:0]=[0 0 0 0]" corresponds to second data, a vector "hit_result_h[2][M−1:0]=[0 1 1 0]" corresponds to third data, and a vector "hit_result_h[3][M−1:0]=[0 0 0 0]" corresponds to fourth data.

If a component value of a vector indicates "1", it signifies that upper K bits "Tag add[N−1:N−K]" of a tag address and upper K bits "tagway[N−1:N−K]" of tag data of a corresponding way match each other. If a component value of a vector indicates "0", it signifies that the upper K bits "Tag add[N−1:N−K]" of the tag address and upper K bits "tagway [N−1:N−K]" of tag data of a corresponding way do not match each other. Since this operation is described about in detail above with reference to FIG. 6, a detailed description thereof is omitted.

Referring again to FIG. 8, in operation S820, the cache memory system 100 determines an update candidate with respect to each of the data, based on a component value of the vector "hit_results_h[ ][M−1:0]".

For example, when the component value of the vector is "0", that is, the upper K bits of the tag data of the corresponding way and the upper K bits of the tag address do not match each other, the cache memory system 100 may determine that the data that is externally requested, for example, by the core 50 of FIG. 1, and the cache data corresponding to the tag data have no spatial locality. Accordingly, the cache memory system 100 may determine the cache data of the way corresponding to the component indicating "0" among the components of the vector "hit_results_h[ ][M−1:0]" as an update candidate.

Referring again to FIG. 9, the cache memory system 100 may determine, for the first data, cache data corresponding to the second way (the second cache data), cache data corresponding to the third way (the third cache data), and cache data corresponding to the fourth way (the fourth cache data), as an update candidate. Also, the cache memory system 100 may determine, for the second data and the fourth data, cache data corresponding to any of the first to fourth ways (the first to fourth cache data), as an update candidate, and may determine, for the third data, any of the first cache data and the fourth cache data, as an update candidate.

Referring again to FIG. 8, in operation S830, the cache memory system 100, for a plurality of pieces of data, erases cache data having the largest number of being determined to be an update candidate, and may update the erased cache data with new data.

For example, referring again to FIG. 9, the first cache data is determined to be an update candidate with respect to the second to fourth data, and has a number of being determined to be an update candidate is 3 times. Also, the second cache data is determined to be an update candidate with respect to the first, second, and fourth data, and has a number of being determined to be an update candidate is 3 times. Also, the third cache data is determined to be an update candidate with respect to the first, second, and fourth data, and has a number of being determined to be an update candidate is 3 times. Also, the fourth cache data is determined to be an update candidate with respect to the first to fourth data, and has a number of being determined to be an update candidate is 4 times. Accordingly, the cache memory system 100 may erase the fourth cache data having the largest number of being determined to be an update candidate, and may update the erased cache data with new data.

When a plurality of vectors are output as illustrated in FIG. 9, the cache memory system 100 may sum component values of the vectors according to each of ways. The cache memory system 100 may select one of the ways that has the smallest sum value, may erase cache data corresponding to the selected way, and may update the erased cache data with new data.

For example, in FIG. 9, a sum value of the first way is 1, a sum value of the second way is 1, a sum value of the third way is 1, and a sum value of the fourth way is 0. The cache memory system 100 may select the fourth way having the smallest sum value, may erase cache data corresponding to the selected fourth way, and may update the erased cache data with new data.

Figure 10:
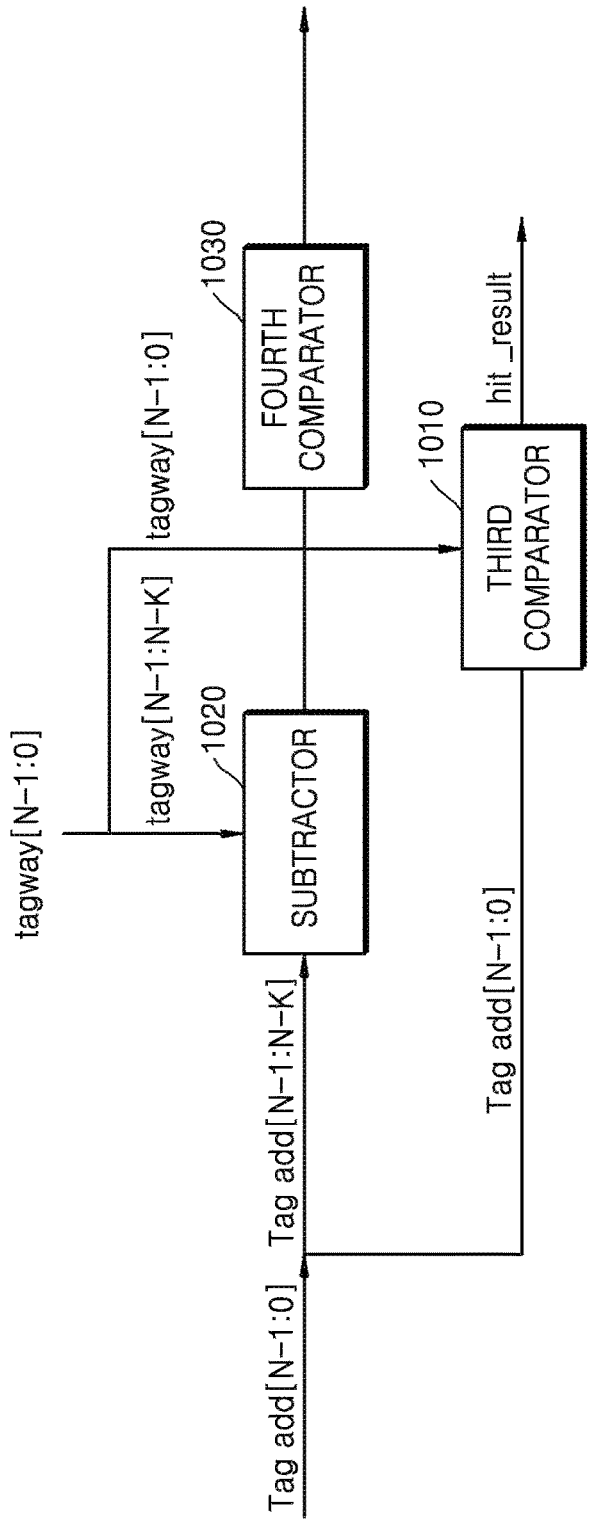
FIG. 10 is a circuit diagram illustrating another example of a method of comparing tag data corresponding to one of a plurality of ways included in one set, with a tag address.

FIG. 10 is a circuit diagram illustrating another example of a method of comparing tag data corresponding to one of a plurality of ways included in one set, with a tag address. Referring to FIG. 10, the tag data and the tag address stored in the tag memory 123 are indicated by N bits. Also, the tag comparator 110 includes a third comparator 1010 and a subtractor 1020. The third comparator 1010 is an N-bit comparator, and the subtractor 1020 is a K-bit subtractor.

The third comparator 1010 compares the N-bit "Tag add[N−1:0]" of the tag address "Tag add" and the N-bit "tagway[N−1:0]" of the tag data. When the N-bit "Tag add[N−1:0]" of the tag address "Tag add" and the N-bit "tagway[N−1:0]" of the tag data match each other, the third comparator 1010 may output "1". Otherwise, the third comparator 1010 may output "0". Alternatively, when the N-bit "Tag add[N−1:0]" of the tag address "Tag add" and the N-bit "tagway[N−1:0]" of the tag data match each other, the third comparator 1010 may output "0". Otherwise, the third comparator 1010 may output "1". However, the present example is not limited thereto. In the following description, for convenience of explanation, when input bit data match each other, the third comparator 1010 outputs "1".

The subtractor 1020 determines a difference value between the upper K bits "Tag add[N−1:N−K]" of the tag address and the upper K ($1 \leq K < N$) bits "tagway[N−1:N−K]" of the tag data.

Also, the tag comparator 110 includes the fourth comparator 1030. The fourth comparator 1030 may output "1" when the difference value output from the subtractor 1020 is less than or equal to a predetermined value, and may output "0" when the difference value output from the subtractor 1020 exceeds the predetermined value. However, the present example is not limited thereto.

Figure 11:
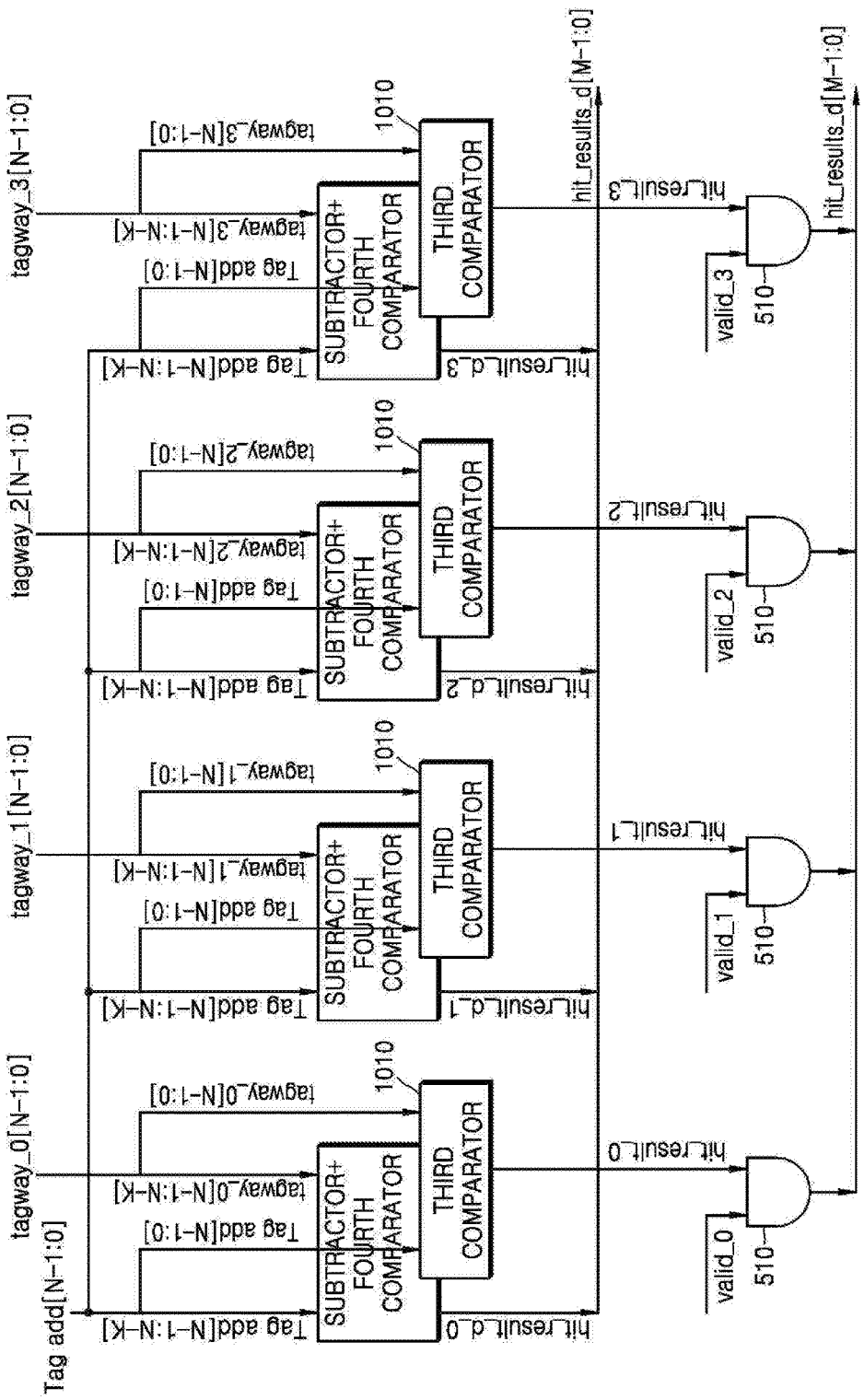
FIG. 11 is a circuit diagram illustrating another example of a method of comparing pieces of tag data corresponding to a plurality of ways included in one set, respectively with tag addresses.

FIG. 11 is a circuit diagram illustrating another example of a method of comparing pieces of tag data corresponding to a plurality of ways included in one set, respectively with tag addresses. Referring to FIG. 11, when there are M-number of ways, the tag comparator 110 includes an M-number of third comparators, an M-number of subtractors, an M-number of fourth comparators, and an M-number of the second AND operators.

As described with reference to FIG. 10, the tag comparator 110 compares each piece of the tag data corresponding to a plurality of ways with the tag address. Since a method of comparing the tag data and the tag address is described in detail with reference to FIG. 10, a description thereof is omitted.

The tag comparator 110 includes the second AND operator 510. The second AND operator 510 receives, as inputs, a value "valid_way" indicating whether cache data is stored in a corresponding way of the data memory 125 of FIGS. 2-3 and a value indicating whether the tag data of the corresponding way and the tag address match each other. The value "valid_way" indicating whether cache data is stored may be "1" when cache data is stored in the corresponding way, and may be "0" when cache data is not stored in the corresponding way.

Accordingly, when cache data is not stored in the corresponding way, that is, "valid_way" is "0", and the tag data of the corresponding way and the tag address do not match each other, the second AND operator 510 may output "0". Also, when cache data is stored in the corresponding way, that is, "valid_way" is "1", and the tag data of the corresponding way and the tag address match each other, the second AND operator 510 may output "1".

The tag comparator 110 outputs values output from the M-number of the second AND operators corresponding to the respective ways, as a vector "hit_results_d[M−1:0]", in which an amount of the vector is the same as the M-number of the ways. For example, when the second AND operator 510 corresponding to the first way outputs "1", the second AND operator 510 corresponding to the second way outputs "0", the second AND operator 510 corresponding to the third way outputs "0", and the second AND operator 510 corresponding to the forth way outputs "0", the vector "hit_results_d[M−1:0]" may be expressed as [1,0,0,0].

In this example, when any one of components of the vector indicates "1", the tag comparator 110 determines that there is a cache hit. In other words, when there is a component indicating "1", it signifies that the tag data of the way corresponding to the component matches the tag address, and the cache data corresponding to the tag data that matches the tag address is the target data that is externally requested, for example, by the core 50 of FIG. 1. When a cache hit is determined, the data output portion 150 of FIG. 3 may read the cache data corresponding to the tag data that matches the tag address from the data memory 125, and may output the read cache data.

In contrast, when all components of the vector indicate "0", the tag comparator 110 determines that there is a cache miss. In other words, when the tag data of all ways do not match the tag address, it is meant that the target data that is externally requested, for example, by the core 50, is not stored in the cache memory 120. When a cache miss is determined, the tag comparator 110 may output the values output from the fourth comparators corresponding to the ways as a vector "hit_results_d[N−1:0]".

In this example, the amount of the vector is the same as the M-number of the ways. A component indicating "0" of the components of the vector indicates that a difference between the upper K bits of the tag data corresponding to the component and the upper K bits of the tag address is greater than a predetermined value. In contrast, a component indicating "1" of the components of the vector indicates that the difference between the upper K bits of the tag data corresponding to the component and the upper K bits of the tag address is less than or equal to the predetermined value.

When the upper K bits of the tag data and the upper K bits of the tag address is greater than the predetermined value, the update controller 130 of FIG. 2-e may determine that no spatial locality exists between the cache data corresponding to the tag data and the externally requested data, that is, the target data. Accordingly, the cache data of the way corresponding to the component indicating "0" of the components of the vector "hit_result_d[N−1:0]" may be determined to be an update candidate.

When there is a cache miss, the update controller 130 may receive the target data from the main memory 200, may erase any one of the cache data that is determined to be the update candidate, and may update the erased cache data with new data received from the main memory 200. Also, the data output portion 150 may output the new data received from the main memory 200.

Figure 12:
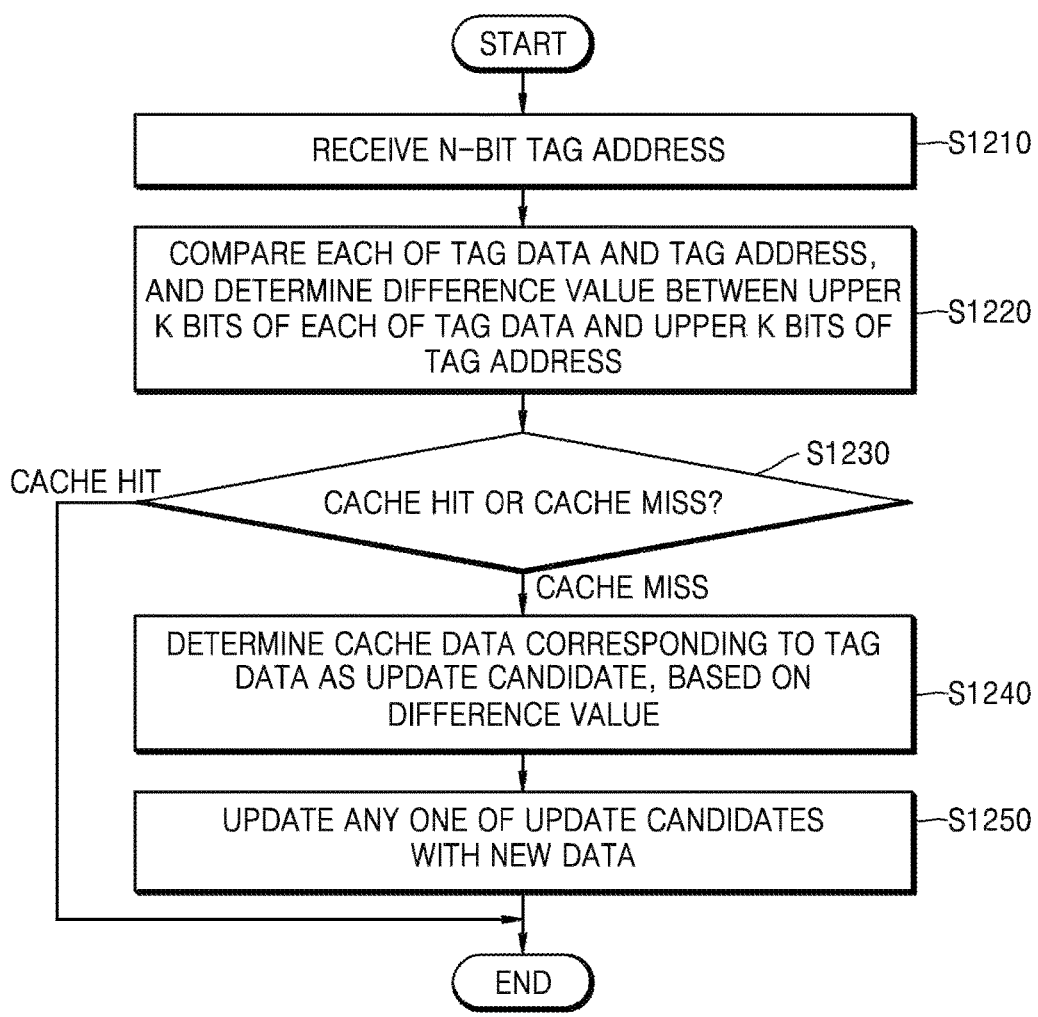
FIG. 12 a flowchart illustrating still another example of a method of updating data of a cache memory system.

FIG. 12 a flowchart illustrating still another example of a method of updating data of the cache memory system 100 according to another example. Referring to FIG. 12, in operation S1210, the cache memory system 100 receives N bits of a tag address.

For example, as described with reference to FIG. 3, the cache memory system 100 receives an external data request, and receives an address bit including a set address "Set add" and a tag address "Tag add" corresponding to requested data. The set address "Set add" is data that indicates a row address of the cache memory 120, and the tag address "Tag add" is an actual address in the main memory 200 of FIG. 1 of the requested data.

Also, the tag address "Tag add" includes N bits. When an address bit is received, the cache memory system 100 outputs tag data included in the set indicated by the set address "Set add". The tag data includes N bits like the tag address "Tag add".

In operation S1220, the cache memory system 100 compares the N bits of each of the output tag data with the N bits of the tag address, determines a difference value between upper K bits of each of the tag data and upper K bits of the tag address, and compares the difference value with a predetermined value. For example, as described with reference to FIG. 10, the cache memory system 100 includes the third comparator 1010, the subtractor 1020, and the fourth comparator 1030. The third comparator 1010 compares the N-bits "Tag add[N−1:0]" of the tag address "Tag add" and the N-bits "tagway [N−1:0]" of the tag data "tagway". Also, the subtractor 1020 determines a difference value between the upper K bits "Tag add[N−1:N−K]" of the tag address and the upper K bits "tagway[N−1:N−K]" of the tag data. Also, the fourth comparator 1030 determines whether the determined difference value is less than or equal to the predetermined value.

In operation S1230, the cache memory system 100 determines whether there is a cache hit or a cache miss, based on a result of the comparison of the N bits of each of the output tag data and the N bits of the tag address. For example, when any one of the output tag data matches the tag address, the cache memory system 100 determines that there is a cache hit. In contrast, when no tag data of the output tag data matches the tag address, the cache memory system 100 determines that there is a cache miss, and continues in operation S1240.

When invalid data exists among the cache data of the set indicated by the set address "Set add", that is, at least one cache line is empty, the target data received from the main memory 200 is stored in the empty cache line. In contrast, when the cache data of the set indicated by the set address "Set add" are all valid, that is, the cache data is stored in all cache lines, the cache memory system 100 continues in operation S1240.

In operation S1240, the cache memory system 100 determines the cache data corresponding to the tag data as an update candidate, based on the difference value between the upper K bits of each of the tag data and the upper K bits of the tag address. For example, when a cache miss is determined, and for each of the output tag data, the difference value between the upper K bits "tagway[N−1:N−K]" of the tag data and the upper K bits "Tag add[N−1:N−K]" of the tag address exceeds the predetermined value, the cache memory system 100 determines the cache data corresponding to the tag data as an update candidate. In contrast, when the difference value between the upper K bits "tagway[N−1:N−K]" of the tag data and the upper K bits "Tag add[N−1:N−K]" of the tag address is less than or equal to the predetermined value, the cache data corresponding to the tag data is removed as the update candidate.

In operation S1250, the cache memory system 100 erases any one of the cache data of determined update candidates, and updates the erased cache data with new data. For example, when a cache miss is determined, the cache memory system 100 may output a cache miss signal, and may receive the target data from the main memory 200. The cache memory system 100 may erase any one of the cache data of the determined update candidates, and may update the erased cache data with the data received from the main memory 200.

Also, the cache memory system 100 may receive a plurality of data requests, each having the same set address. In this example, the cache memory system 100 may compare a tag address and each of tag data included in a set indicated by a set address, for each data, as described with reference to FIGS. 10 and 11. Also, the cache memory system 100 may determine a difference value between upper K bits of the tag address and upper K bits of each piece of the tag data, for each data, as described with reference to FIGS. 10 and 11.

When there is a cache miss, the cache memory system 100 may output the vector "hit_results_d[ ][M−1:0]" for each data, as described with reference to FIG. 13.

FIG. 13 is a diagram illustrating another example of vectors "hit_results_d[ ][M−1:0]" with respect to a plurality of pieces of data. For example, when the cache memory system 100 simultaneously receives four data requests, a vector "hit_results_d[0][M−1:0]=[0 0 0 1]" corresponds to first data, a vector "hit_results_d[1][M−1:0]=[0 0 0 0]" corresponds to second data, a vector "hit_results_d[2][M−1:0]=[1 1 0 0 0]" corresponds to third data, and a vector "hit_results_d[3][M−1:0]=[0 0 0 0]" corresponds to fourth data.

When a component value of a vector indicates "1", it is meant that a difference value between upper K bits "Tag add[N−1:N−K]" of a tag address and upper K bits "tagway [N−1:N−K]" of tag data of a corresponding way is less than or equal to a predetermined value. In contrast, when a component value of a vector indicates "0", it is meant that a difference value between the upper K bits "Tag add[N−1:N−K]" of the tag address and upper K bits "tagway[N−1:N−K]" of tag data of a corresponding way is greater than the predetermined value.

Accordingly, the cache memory system 100 may determine an update candidate for each piece of data, based on a component value of a vector. For example, when a component value of a vector is "0", that is, a difference value between upper K bits of tag data of a corresponding way and the upper K bits of the tag address is greater than the predetermined value, the cache memory system 100 may determine that no spatial locality exists between the externally requested data and the cache data corresponding to the tag data. As such, the cache memory system 100 may determine the cache data of the way corresponding to the component indicating "0" among the components of the vector "hit_result_d[ ][M−1:0]", as an update candidate.

Referring to FIG. 13, the cache memory system 100 determines, for the first data, cache data corresponding to a first way, that is, first cache data, cache data corresponding to a second way, that is, second cache data, and cache data corresponding to a third way, that is, third cache data, as update candidates. Also, the cache memory system 100 determines, for the second data and the fourth data, cache data corresponding to each of first to fourth ways, that is, first to fourth cache data, as update candidates, and determines, for the third data, the first cache data and the second cache data as update candidates. When the update candidate is determined for each of the data, the cache memory system 100 may erase, for pieces of data, the cache data that is the most frequently determined to be an update candidate, and may update the erased cache data with new data.

Since a method of selecting the cache data that is the most frequently determined to be an update candidate among the update candidates is described in detail with reference to FIG. 9, a detailed description thereof is omitted.

Also, when a plurality of vectors are output, the cache memory system 100 may sum component values of vectors for each way. In this example, the cache memory system 100 may select a way having the least sum value among the ways, may erase cache data corresponding to the selected way, and may update the erased cache data with new data.

Since a method of selecting the cache data based on the sum value for each way among the update candidates is described with reference to FIG. 9, a detailed description thereof is omitted.

As described above, when a cache hit or cache miss occurs, a size of memory may be reduced because additional information to determine cache data to replace is not needed. Also, complexity of logic to determine the cache data to replace may be reduced.

The various units, elements, and methods described above may be implemented using one or more hardware components or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cache memory apparatus comprising:
   a data memory configured to store pieces of cache data corresponding to pieces of data stored in a main memory;
   a tag memory configured to store pieces of tag data respectively corresponding to the pieces of the cache data, each of the pieces of the tag data comprising N bits;
   a tag comparator configured to
      compare upper K bits, wherein 1≤K<N, of each of the pieces of the tag data corresponding to a set address that is received with upper K bits of a tag address that is received, the tag address comprising N bits;
      compare other (N-K) bits of each of the pieces of the tag data with other (N-K) bits of the tag address, and
      determine whether there is a cache hit or a cache miss based on results of the comparisons; and
   an update controller configured to, in response to the cache miss being determined,
      determine a piece among the pieces of the cache data as an update candidate based on the result of the comparison of the upper K bits of each of the pieces of the tag data and the upper K bits of the tag address, and
      update the update candidate with new data,
   wherein the update controller is configured to, in response to the cache memory apparatus receiving data requests, each having a same set address:
      determine, for each piece of data of the data requests, whether each piece of the cache data is an update candidate based on the result of the comparison of the upper K bits of the tag address that is received for each of the pieces of the data and the upper K bits of each of the pieces of tag data; and
      update, with new data, a piece among the pieces of the cache data that is determined as an update candidate the most.

2. The cache memory apparatus of claim 1, wherein the update controller is configured to:
   determine the piece of the cache data as the update candidate in response to upper K bits of a piece of the tag data that corresponds to the piece of the cache data not matching with the upper K bits of the tag address.

3. The cache memory apparatus of claim 1, wherein the tag comparator is further configured to:
   determine there is a cache miss in response to all of the pieces of the tag data not matching the tag address and output the result of the comparison of the upper K bits of each piece of the tag data and the upper K bits of the tag address to the update controller.

4. The cache memory apparatus of claim 1, wherein the tag comparator is configured to:
   determine there is a cache hit in response to any of the pieces of the tag data matching the tag address.

5. The cache memory apparatus of claim 1, further comprising:
   a data output portion configured to read a piece among the pieces of the cache data that corresponds to a piece among the pieces of the tag data that matches the tag address, and output the read piece, in response to the cache hit being determined.

6. The cache memory apparatus of claim 1, wherein:
   the tag comparator is further configured to output comparison vectors respectively corresponding to the pieces of the data, each of the comparison vectors comprising a same number of components as a number of ways of a set, the components indicating a first value in response to the upper K bits of the tag address of each of the pieces of the data and the upper K bits of each of the pieces of the tag data matching each other, and the components indicating a second value in response to the upper K bits of the tag address of each of the pieces of the data and the upper K bits of each of the pieces of the tag data not matching, each other; and
   the update controller is configured to
   sum the components of the comparison vectors for each of the ways, and
   update, with new data, cache data corresponding to any one of the ways, based on the summed components.

7. The cache memory apparatus of claim 6, wherein:
   the first value is 1, and the second value is 0; and the update controller is configured to update, with new data, cache data corresponding to a way having a smallest component among the summed components.

8. A cache memory apparatus comprising:
a data memory configured to store pieces of cache data corresponding to pieces of data stored in a main memory;
a tag memory configured to store pieces of tag data respectively corresponding to the pieces of the cache data, each of the pieces of the tag data comprising N bits;
a tag comparator configured to
calculate a difference between upper K bits, wherein 1≤K<N, of each of the pieces of the tag data corresponding to a set address that is received with upper K bits of a tag address that is received, the tag address comprising N bits;
compare the tag address and each of the pieces of the tag data, and
determine whether there is a cache hit or a cache miss based on results of the comparison; and
an update controller configured to, in response to the cache miss being determined,
determine a piece among the pieces of the cache data as an update candidate based on the difference, and
update the update candidate with new data,
wherein the update controller is configured to, in response to the cache memory apparatus receiving data requests, each having a same set address:
determine, for each piece of data of the data requests, whether each piece of the cache data is an update candidate based on the result of the comparison of the upper K bits of the tag address that is received for each of the pieces of the data and the upper K bits of each of the pieces of tag data; and
update, with new data, a piece among the pieces of the cache data that is determined as an update candidate the most.

9. The cache memory apparatus of claim 8, wherein the update controller is configured to:
determine the piece of the cache data as the update candidate in response to the difference being greater than or equal to a predetermined value.

10. The cache memory apparatus of claim 8, wherein the tag comparator is further configured to:
determine there is a cache miss in response to all of the pieces of the tag data not matching the tag address, and output the difference to the update controller.

11. A method of operating a cache memory apparatus, the method comprising:
comparing upper K bits, wherein 1≤K<N, of each of pieces of tag data corresponding to a set address that is received with upper K bits of a tag address that is received, the pieces of the tag data respectively corresponding to pieces of cache data as the set, each of the pieces of the tag data comprising N bits, the tag address comprising N bits, and the pieces of the cache data corresponding to pieces of data;
comparing other (N-K) bits of each of the pieces of the tag data with other (N-K) bits of the tag address, and
determining whether there is a cache hit or a cache miss based on results of the comparisons; and
in response to the cache miss being determined, determining a piece among the pieces of the cache data as an update candidate based on the result of the comparison of the upper K bits of each of the pieces of the tag data and the upper K bits of the tag address, and updating the update candidate with new data,
wherein in response to receiving data requests, each having a same set address:
the determining of the piece of the cache data as the update candidate comprises determining, for each piece of data of the data requests, whether each piece of the cache data is an update candidate based on the result of the comparison of the upper K bits of the tag address that is received for each of the pieces of the data and the upper K bits of each of the pieces of tag data; and
the updating of the update candidate comprises updating, with new data, a piece among the pieces of the cache data that is determined as an update candidate the most.

12. The method of claim 11, wherein the determining of the piece of the cache data as the update candidate comprises:
determining the piece of the cache data as the update candidate in response to upper K bits of a piece of the tag data that corresponds to the piece of the cache data not matching with the upper K bits of the tag address.

13. The method of claim 11, wherein the determining of whether there is a cache hit or a cache miss comprises:
determining there is a cache miss in response to all of the pieces of the tag data not matching the tag address, and outputting the result of the comparison of the upper K bits of each piece of the tag data and the upper K bits of the tag address.

14. The method of claim 11, wherein the determining of whether there is a cache hit or a cache miss comprises:
determining there is a cache hit in response to any of the pieces of the tag data matching the tag address.

15. The method of claim 11, further comprising:
reading a piece among the pieces of the cache data that corresponds to a piece among the pieces of the tag data that matches the tag address, and outputting the read piece, in response to the cache hit being determined.

16. The method of claim 11, further comprising:
outputting comparison vectors respectively corresponding to the pieces of the data, each of the comparison vectors comprising a same number of components as a number of ways of a set, the components indicating a first value in response to the upper K bits of the tag address of each of the pieces of the data and the upper K bits of each of the pieces of the tag data matching each other, and the components indicating a second value in response to the upper K bits of the tag address of each of the pieces of the data and the upper K bits of each of the pieces of the tag data not matching each other,
wherein the updating of the update candidate comprises summing the components of the comparison vectors for each of the ways, and
updating, with new data, cache data corresponding to any one of the ways, based on the summed components.

17. The method of claim 16, wherein:
the first value is 1, and the second value is 0; and
the updating of the updating candidate comprises updating, with new data, cache data corresponding to a way having a smallest component among the summed components.

18. A method of operating a cache memory apparatus, the method comprising:

calculating a difference between upper K bits, wherein 1≤K<N, of each of pieces of tag data corresponding to a set address that is received and upper K bits of a tag address that is received, the pieces of the tag data respectively corresponding to pieces of cache data as the set, each of the pieces of the tag data comprising N bits, the tag address comprising N bits, and the pieces of the cache data corresponding to pieces data;

comparing the tag address and each of the pieces of the tag data, and determining whether there is a cache hit or a cache miss based on results of the calculation and comparison; and in response to the cache miss being determined, determining a piece among the pieces of the cache data as an update candidate based on the difference, and updating the update candidate with new data, wherein in response to receiving data requests, each having a same set address:
the determining of the piece of the cache data as the update candidate, comprises determining, for each piece of data of the data requests, whether each piece of the cache data is an update candidate based on the result of the comparison of the upper K bits of the tag address that is received for each of the pieces of the data and the upper K bits of each of the pieces of tag data; and
the updating of the update candidate comprises updating, with new data, a piece among the pieces of the cache data that is determined as an update candidate the most.

19. The method of claim 18, wherein the determining of the piece of the cache data as the update candidate comprises:
determining the piece of the cache data as the update candidate in response to the difference being greater than or equal to a predetermined value.

20. The method of claim 18, wherein the determining of whether there is a cache hit or a cache miss further comprises:
determining there is a cache miss in response to all of the pieces of the tag data not matching the tag address, and outputting the difference.

21. The method of claim 18, wherein, in response to receiving the data requests, each having a same set address:
the determining of the piece of the cache data as the update candidate comprises determining the piece of the cache data as the update candidate for each of pieces of data of the data requests based on the difference; and
the updating of the update candidate comprises updating, with new data, the piece among the pieces of the cache data that is most frequently determined as the update candidate.

22. A cache memory apparatus comprising:
a tag comparator configured to
compare upper bits of each of pieces of tag data included in a set indicated by a set address that is received with upper bits of a tag address that is received,
compare other bits of each of the pieces of the tag data with other bits of the tag address, and
determine whether there is a cache hit or a cache miss based on results of the comparisons; and
an update controller configured to, in response to the cache miss being determined,
determine, as an update candidate, a piece among the pieces of the cache data included in the set and corresponding to the pieces of the tad data, based on the result of the comparison of the upper bits of each of the pieces of the tag data and the upper bits of the tag address, and
update the update candidate with new data,
wherein the update controller is configured to, in response to the cache memory apparatus receiving data requests, each having a same set address:
determine, for each piece of data of the data requests, whether each piece of the cache data is an update candidate based on the result of the comparison of the upper K bits of the tag address that is received for each of the pieces of the data and the upper K hits of each of the pieces of tag data; and
update, with new data, a piece among the pieces of the cache data that is determined as an update candidate the most.

23. The cache memory apparatus of claim 22, wherein the tag comparator is configured to:
determine there is a cache miss in response to all of the pieces of the tag data not matching the tag address; and
determine there is a cache hit in response to any of the pieces of the tag data matching the tag address.

24. The cache memory apparatus of claim 22, wherein the update controller is configured to:
determine, as the update candidate, the piece of the cache data in response to the upper bits of a piece of the tag data that corresponds to the piece of the cache data not matching with the upper bits of the tag address.

25. A cache memory apparatus comprising:
a data memory configured to store pieces of cache data corresponding to pieces of data stored in a main memory;
a tag memory configured to store pieces of tag data respectively corresponding to the pieces of the cache data;
a tag comparator configured to determine whether there is a cache hit or a cache miss by comparing each of the pieces of the tag data with a tag address that is received, wherein the comparing each of the pieces of the tag data with the tag address comprises comparing upper K bits of each of the pieces of the tag data with upper K bits of a tag address and comparing other (N-K) bits of each of the pieces of the tag data with other (N-K) bits of the tag address, and
an update controller configured to determine a cache data to be updated based on results of the comparison of the upper K bits of each of the pieces of the tag data and the upper K bits of the tag address,
wherein the update controller is configured to, in response to the cache memory apparatus receiving data requests, each having a same set address:
determine, for each piece of data of the data requests, whether each piece of the cache data is an update candidate based on the result of the comparison of the upper K bits of the tag address that is received for each of the pieces of the data and the upper K bits of each of the pieces of tag data; and
update, with new data, a piece among the pieces of the cache data that is determined as an update candidate the most.

* * * * *